US010303874B2

United States Patent
Wang et al.

(10) Patent No.: US 10,303,874 B2
(45) Date of Patent: May 28, 2019

(54) MALICIOUS CODE DETECTION METHOD BASED ON COMMUNITY STRUCTURE ANALYSIS

(71) Applicant: SICHUAN UNIVERSITY, Chengdu, Sichuan (CN)

(72) Inventors: Junfeng Wang, Chengdu (CN); Xiaosong Zhang, Chengdu (CN); Yao Du, Chengdu (CN); Jie Liang, Chengdu (CN); Yong Ma, Chengdu (CN)

(73) Assignee: SICHUAN UNIVERSITY, Sichuan (CN)

( * ) Notice: Subject to any disclaimer, the term of this patent is extended or adjusted under 35 U.S.C. 154(b) by 78 days.

(21) Appl. No.: 15/630,450

(22) Filed: Jun. 22, 2017

(65) Prior Publication Data
US 2018/0144132 A1 May 24, 2018

(30) Foreign Application Priority Data
Nov. 18, 2016 (CN) .......................... 2016 1 1018781

(51) Int. Cl.
| | |
|---|---|
| *G06F 21/56* | (2013.01) |
| *G06Q 10/04* | (2012.01) |
| *G06F 11/36* | (2006.01) |
| *G06F 17/16* | (2006.01) |
| *G06F 17/27* | (2006.01) |
| *G06N 99/00* | (2019.01) |

(52) U.S. Cl.
CPC .......... *G06F 21/563* (2013.01); *G06F 21/561* (2013.01); *G06Q 10/047* (2013.01); *G06F 11/3676* (2013.01); *G06F 17/16* (2013.01); *G06F 17/2785* (2013.01); *G06N 99/005* (2013.01)

(58) Field of Classification Search
CPC ..................................................... G06F 21/563
USPC ........................................................ 726/24
See application file for complete search history.

(56) References Cited

U.S. PATENT DOCUMENTS

| | | | | |
|---|---|---|---|---|
| 9,021,589 | B2 * | 4/2015 | Anderson | G06F 21/566 709/206 |
| 9,378,012 | B2 * | 6/2016 | Soeder | G06F 8/75 |
| 9,672,355 | B2 * | 6/2017 | Titonis | G06F 21/56 |
| 9,900,324 | B1 * | 2/2018 | Barua | H04L 63/14 |

(Continued)

*Primary Examiner* — Khalil Naghdali
(74) *Attorney, Agent, or Firm* — Oliff PLC

(57) ABSTRACT

This invention comes up with a kind of Android malicious code detection method on the base of community structure analysis. During the reverse analysis process of target program, firstly, it obtains critical static feature information automatically, such as permission, function, class, system API, etc.; secondly, it uses the call relation between functions to create function call graph, and undertakes pretreatment on function call graph; make cycle division and analysis for the weighted function call graph so as to get the correction division of community structure; finally, it extract features from community structures for machine learning and get the final maliciousness determination result. This invention method is able to undertake program internal structure analysis and malicious code detection rapidly when facing a large number of Android application program samples generated by "repackaging" technology.

4 Claims, 4 Drawing Sheets

(56) References Cited

U.S. PATENT DOCUMENTS

Figure 1:
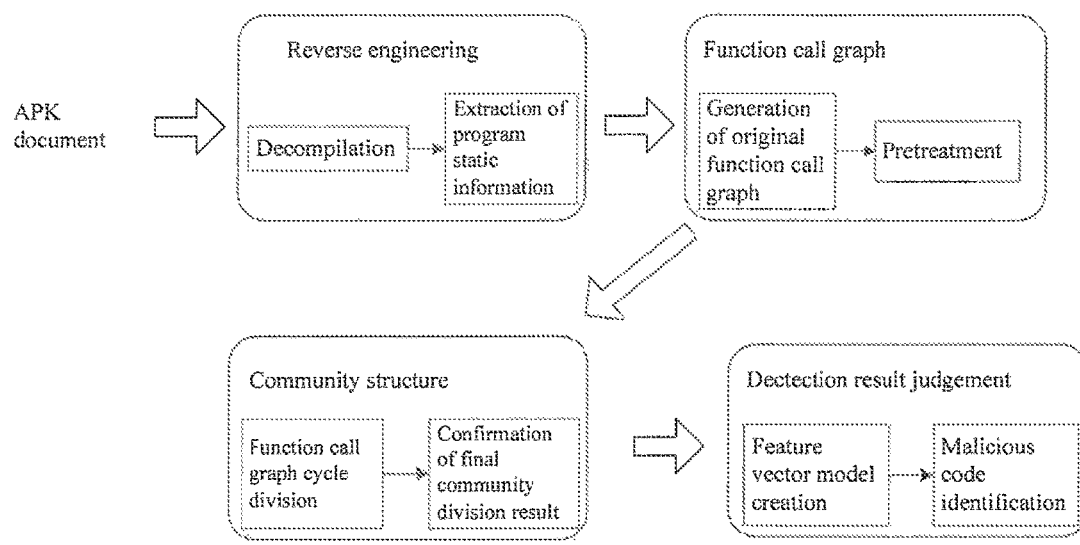

2007/0240217 A1* 10/2007 Tuvell .................... G06F 21/56
726/24
2015/0302198 A1* 10/2015 Payne ................... G06F 21/562
726/23
2017/0214701 A1* 7/2017 Hasan ................ H04L 63/1408

* cited by examiner

MALICIOUS CODE DETECTION METHOD BASED ON COMMUNITY STRUCTURE ANALYSIS

TECHNOLOGY FIELD

This invention involves malicious code detection field of Android mobile client application, especially concern the rapid detection of a large number of malicious codes from Android application program sample that generated from "repackaging" technology.

BACKGROUND TECHNOLOGY

In recent years, along with the technology of "repackaging" and "obfuscated code" are widely applied to malicious mobile applications, a lot of research work against malicious code have been carried around the analysis on internal structure of application program. Many detection methods that based on internal structure feature of the program can extract or build different graph structures by analyzing the decompilation code of target program; then judge the maliciousness of the program by comparing the difference degree between target sample and malicious sample graph structure. The research results show that this kid of detection method has relatively good effect against the technology of "repackaging" and "obfuscated code".

Comparing to the traditional signature-based detection methods, this kind of method mainly solves two main problems as below. Firstly, the detection method on the base of signature has bad timeliness. It is difficult to find out unknown virus. Most signature-based detection methods require the help of manual analysis, and extract the byte sequence or specific string with virus information as feature and store into the feature database. Then, it judges the maliciousness of the program by the feature matching with the program code under detection. However, most of structure feature based methods are able to realize automatic analysis and detection of the sample. Generally, this method is enlightening. It is better to identify unknown virus. Secondly, the signature-based detection methods have low efficiency under a large number of variant samples from "repackaging". At the same time, "obfuscated code" technology would increase the difficulty on the analysis of target program. Whereas, the detection methods of structure feature use the feature that the internal structure of most of the new variant samples is similar to existing virus. It can compare the similarity of the two and identify the virus quickly. The internal structure analysis of the program could also resist partial obfuscated code technology.

However, during the actual application, many detection methods on the base of structure feature have shortcomings on execution time, creation and analysis of graph structure. The main reasons are as below: firstly, generally speaking, the internal call structure of the application program is complicated. In order to compare the similarity of the graph, normally, it needs to store a large number of graph structure with malicious behavior as feature database. On this basis, there is huge calculation load for calculating the similarity by matching graph or subgraph. Secondly, on the aspect of building graph structure, many methods are inclined to endow partial semantic information to graph structure, and form various kinds of graph structure, such as control flow graph, data dependence graph, and permission event graph, etc. However, these methods require accurate matching to a given standard; on the contrary, it is adverse to against a large number of varietal viruses. Meanwhile, create new graph by using known sample feature is also not good for detecting unknown virus.

In the structure analysis of internal function call graph of mobile application, it is discovered that the function call graph structure in mobile application program is different from random network. Function call graph has the feature of complicated network for some part, such as scale-free. Therefore, the function call graph can be divided into many community structures by utilizing community generation method. In these community structures, there are close contact among nodes, while sparse contact with the nodes in other community. However, the community which divided on the base of pure structure feature is not always the best reflection of behavior feature from the application program. Therefore, it needs to combine the other features of mobile application program during the process of community division in order to judge division result together.

INVENTION CONTENT

The technical problem that this invention needs to solve is to provide a kind of Android malicious code detection method on the base of community structure analysis, solve the problem of traditional malicious code detection methods of structure feature, such as high time consuming from graph similarity comparison, shortcoming of against a large number of varietal virus from repackaging technology after building specific meaning graph structure; improve the community creation method, and execution efficiency during graph division of this method.

In order to solve above mentioned technical problems, this invention adopts the technical proposal as below:

A kind of Android malicious code detection method on the base of community structure analysis, including following steps:

Step 1: Undertake decompilation on the mobile application program which is under detection in order to get decompilation code and extract static information of mobile application program;

Step 2: Get the frequency data of static feature in benign sample or malicious sample through analyzing the static information of mobile application program; and distribute malicious value respectively according to their frequency difference in different samples;

Step 3: Build function call graph;

Step 4: Undertake pretreatment for the function call graph, including deleting isolated node, and distributing weight for the node of function call graph;

Step 5: Define the calculation of betweenness by searching the shortest path from key node to other nodes. The definition of key node is showed as below:

$$C = C_i * w(i) = (D_i/(n-1)) * \left(\left(\sum_{m=1}^{k} w(q_m)\right) - k + 1\right)$$

In the formula, n represents the node quantity in the graph; $D_i$ is the degree of node i; K is the node quantity which connects directly to node i; $W(q_m)$ is the weight of node m in node set of k;

Graph definition $G=(V, E)$, while V is node set; E is frontier set; then the calculation formula of edge betweenness is as below:

$$B_b = \left( \sum_{v_i \in V, v_j \in V, e \in E} \phi_{v_i v_j}(e) \right) / g_e$$

In the formula, $\phi_{v_i v_j}(e)$ is the shortest path between node I and j which contains edge e. $g_e$ is the weight of edge e;

Step 6: Define the modularity Q as $$Q = \Sigma_j (e_{jj} - a_j^2)$$

In the formula, the matrix element of community j is defined as $e_{jj}$. It represents edge quantity in community j; $a_j^2$ represents the quantity of edges that connect to any node in community structure j; when Q value reaches to peak and start to decline, it ends calculation;

Step 7: Record the community divided versions which formed after each deletion of the edges with the highest betweeness. Through the evaluation of the malicious value, property and node scale situation of each community in these divided versions, select the best divided version;

Step 8: Extract the information on three aspects as classification feature among the confirmed community divided version, i.e. community quantity with malicious feature, the highest malicious value in each community, total of malicious value of each community;

Step 9: Undertake machine learning classification on classification features and get the malicious determination result.

Furthermore, the mentioned static information include permissions in mobile application program, functions related to permissions, system APIs, JAVA packages, classes, all the function and their call relations.

Furthermore, the training stage of machine classification learning is carried out by adopting offline separate training in step 9.

Furthermore, the adopted decompilation tool is androguard or apktool in step 1.

Comparing to existing technology, the beneficial effects of this invention are as below:

1. During the detection of a large number of varietal virus samples from repackaging technology, this invention method has relatively high detection rate.

2. This invention method adopts machine learning method instead of the comparison of graph similarity. It reduces the complexity of calculation greatly, and improves the execution efficiency of the program.

3. During the graph division, it improves classic GN community generation method, and further improves operation efficiency of the program.

4. During the generation process of the community, it combines static feature to judge the best division effect rather than confirm the community result by topological structure of graph. Thus, the community which divided by this method could better reflect the real behaviors of mobile application.

5. The training step of machine learning adopts offline separate training. It will not reduce the operation efficiency during the actual detection of target program.

FIGURE EXPLANATION

Figure 2:
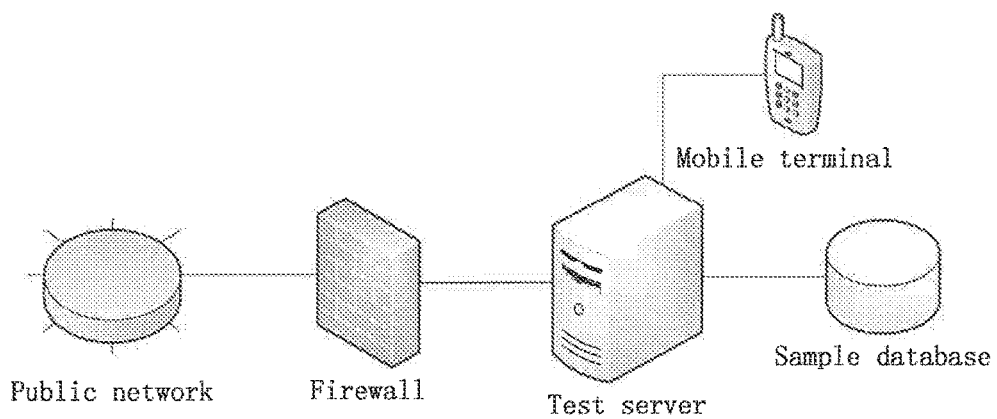
Figure 3:
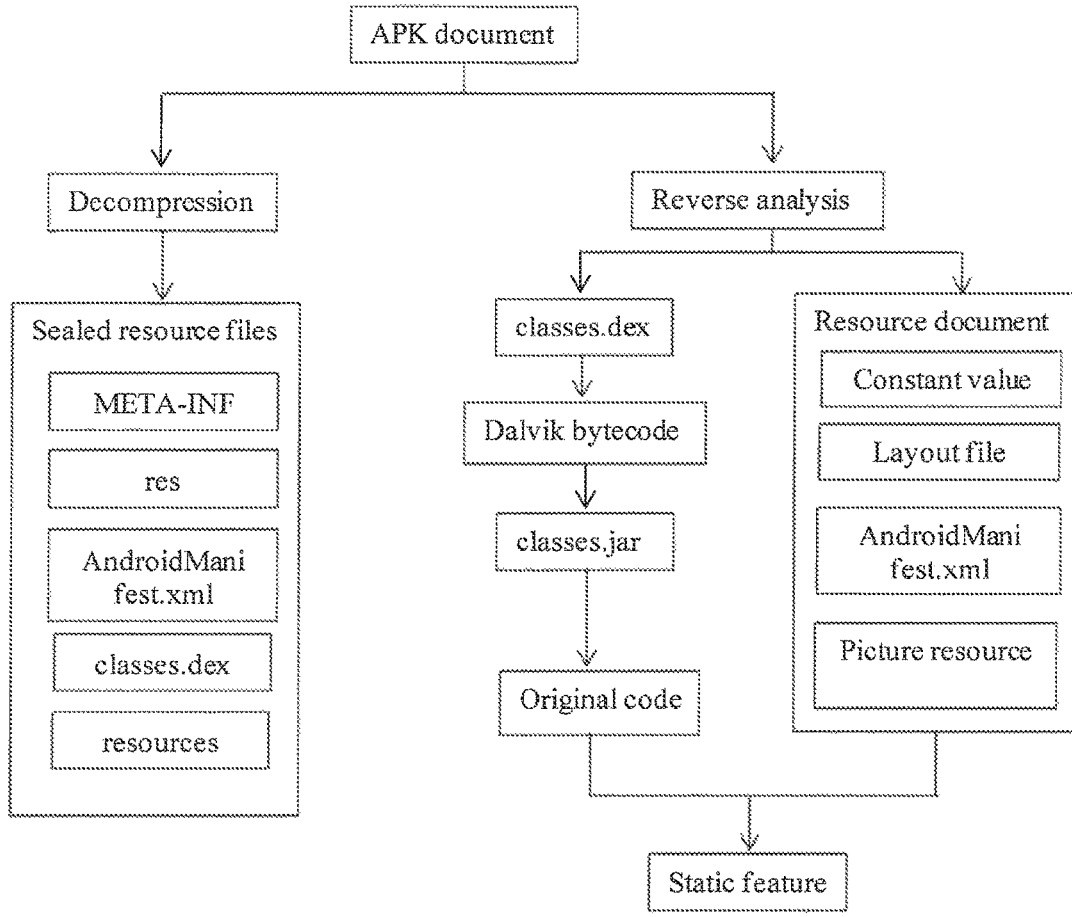
Figure 4:
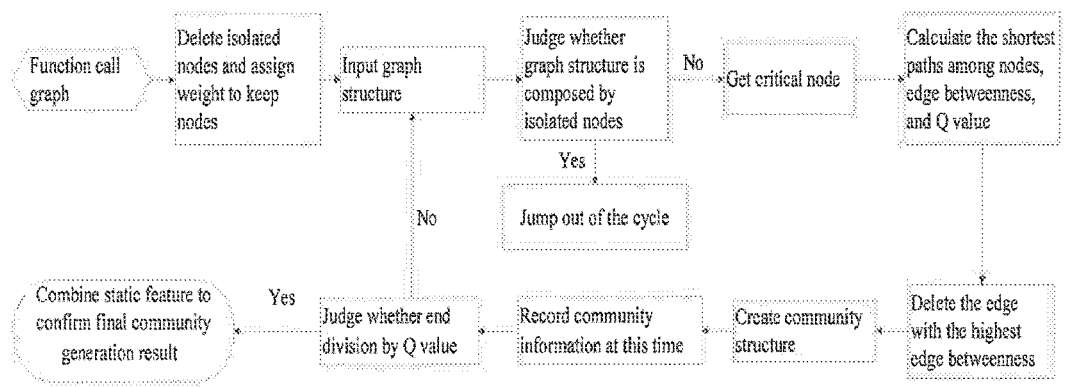
Figure 5:
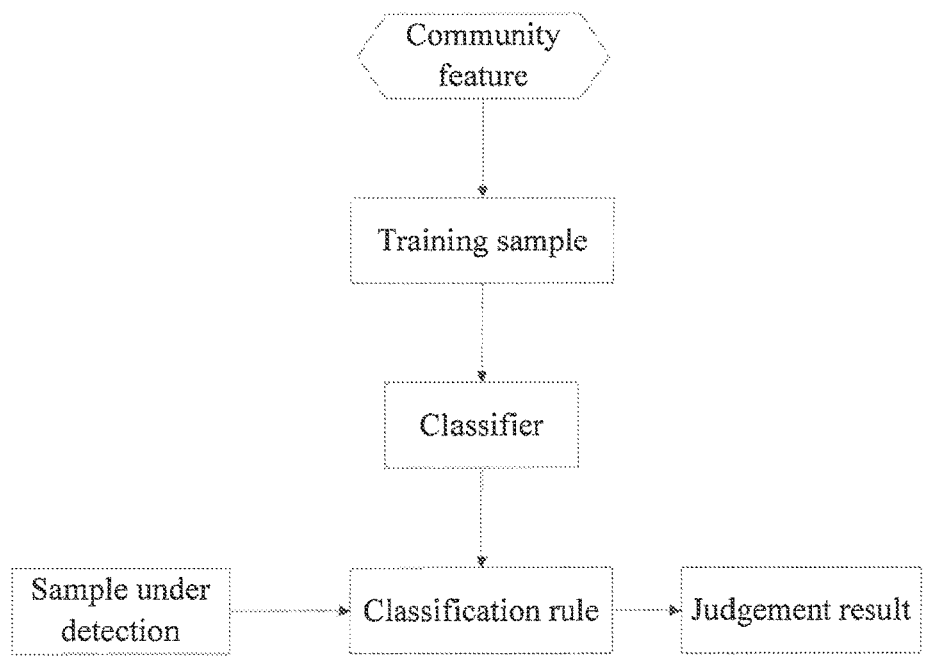
Figure 6:
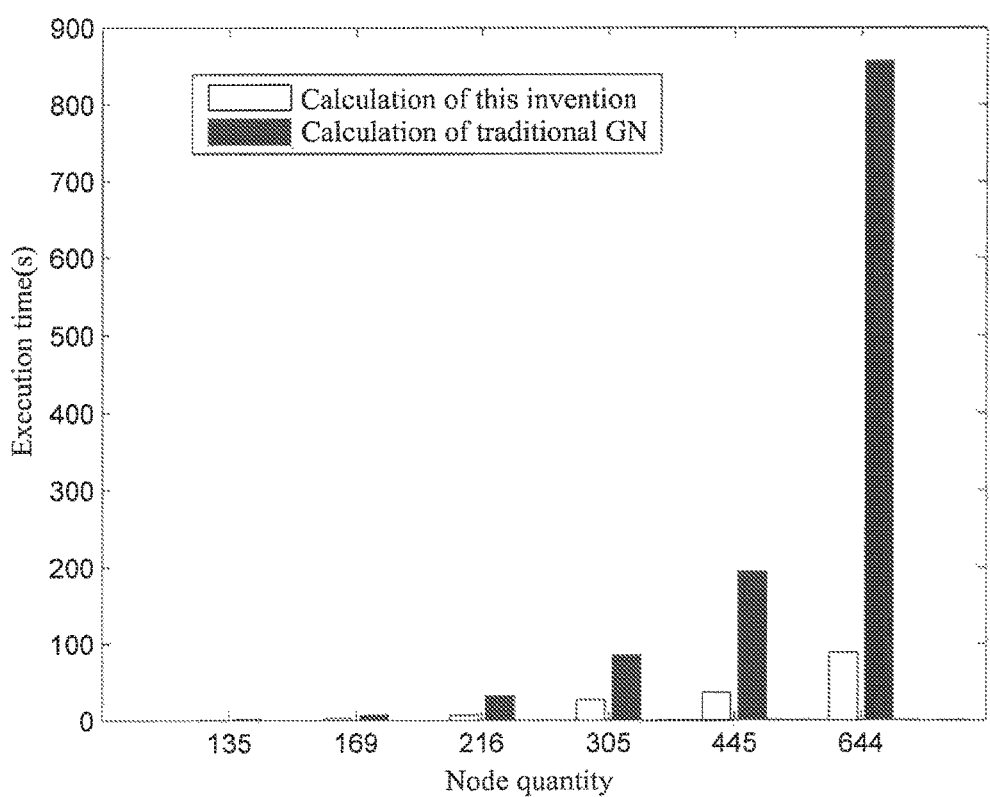
Figure 7:
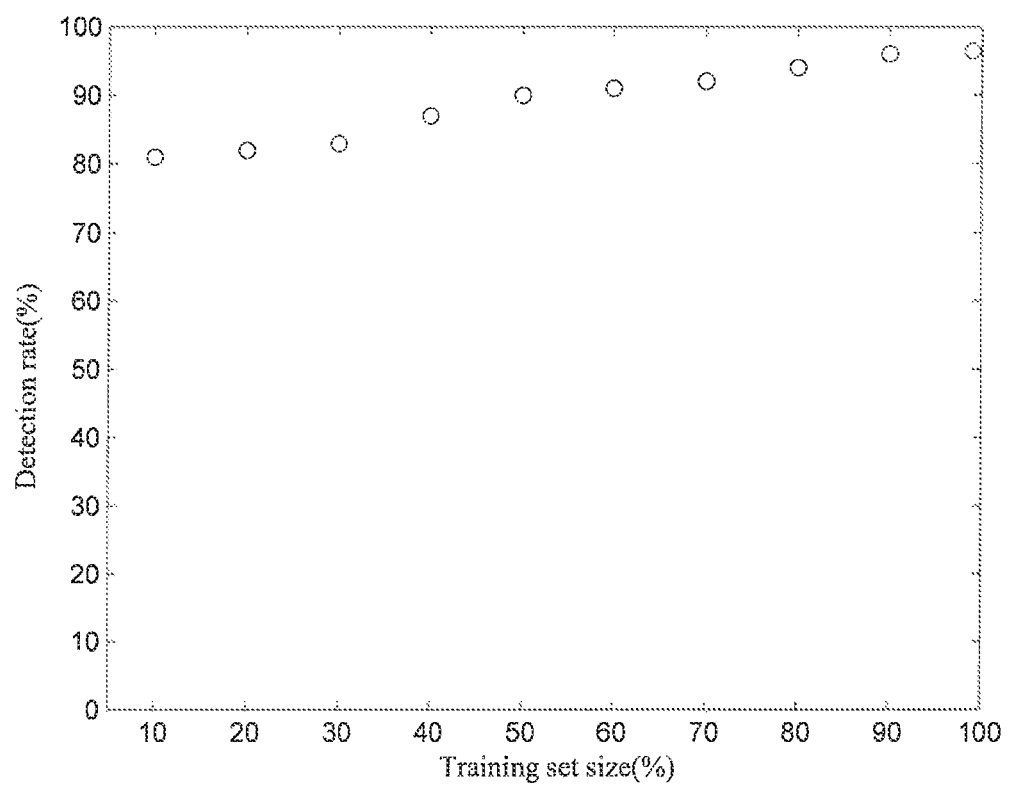

FIG. 1 is the overall frame of malicious code detection method.
FIG. 2 is testing environment topology of this invention.
FIG. 3 is reverse engineering flow chart of Android application program.
FIG. 4 is community generation flow chart of this invention.
FIG. 5 is the flow chart of machine learning and malicious code identification.
FIG. 6 is the comparison of community generation efficiency between this invention and traditional GN method.
FIG. 7 is the detection efficiency of his invention method under training set of different scales.

SPECIFIC EXECUTION METHOD

Hereby, it gives further detailed explanation of this invention by combining figure and specific execution method. This invention method combines the structure feature of function call graph, and static feature of application program to judge the most ideal community division result. Then, extract the machine learning features from the final division result, and put them into feature vector model for classification learning so as to reach the purpose of judging the maliciousness of the application program. This invention method improves the graph division efficiency by improving GN method, and judge the maliciousness by adopting machine learning technology to avoid complex calculation of graph similarity comparison. The experiment result shows that this method is able to identify malicious code efficiently.

Build detection environment according to testing environment topology in FIG. 2. The operation system of test server is ubuntu 12.04; decompilation tool deployment Androguard1.6, etc.; Java operation environment deployment Eclipse 4 or its higher version. The mobile terminal carries Android 2.x and higher versions in order to meet the requirement of Android applications of different period and categories. It is recommended that the space of sample database shall be above 500 G with continuous expandability in order to accommodate enough samples. Firewall shall be equipped on the test server.

The specific realization process of this invention is stated as below:

Step 1: first of all, undertake decompilation on the mobile application program which is under detection in order to get decompilation code, such as ".smali" code file, etc., and extract static information that the mobile application program uses, such as permissions, functions related to permissions, system APIs, JAVA packages, classes, all the functions and their call relations. For example, as FIG. 3, undertake decompilation on APK file by using decompilation tool (such as androguard, apktool, etc.), and obtain layout file in "res" folder, picture resources in "dawable" folder, component declaration and permission declaration in "AndroidManifest.xml" file, and constant value in "values" folder, etc. At the same time, modify the suffix ".apk" to ".zip" or ".rar"; obtain classes.dex file by decompression tools; make decompilation by dex2jar tool and get classes.jar file; get Java original code of the application program by JD-GUI.

Step 2: Through analyzing a large number of static information of mobile application program, get the frequency data of static feature in benign sample or malicious sample with different permissions, system APIs, and packages; and distribute malicious value respectively according to their occurrence frequency difference in different samples;

Step 3: Build function call graph according to all the functions and their call relations which extracted in step 1.

Step 4: Undertake pretreatment for the function call graph, mainly including two aspects: firstly, delete isolated node. Isolated node is difficult to reflect some behavior feature of the code; meanwhile, the function module that created by repackaging technology is difficult to occur on the isolated node, so delete it. Secondly, distribute weight for the nodes of function call graph. The node weight is the sum of the malicious values with related sensitive information.

Step 5: In order to improve the graph division efficiency, GN algorithm is improved. This method redefines the calculation process of edge betweenness as the shortest path from critical node to other nodes. The definition of critical node is as below:

$$C = C_i * w(i) = (D_i/(n-1)) * \left(\left(\sum_{m=1}^{k} w(q_m)\right) - k + 1\right)$$

In the formula, n represents the node quantity in the graph; $D_i$ is the degree of node i; K is the node quantity which connects directly to node i; W ($q_m$) is the weight of node m in node set k. Pay attention that edge weight needs to be considered during edge betweenness calculation so as to ensure the edge with higher weight will not be deleted easily. Therefore, the edge betweenness is also be redefined.

Assume that the graph is defined as G=(V, E), while V is node set; E is edge set, then the calculation formula of edge betweenness is as below;

$$B_b = \left(\sum_{v_i \in V, v_j \in V, e \in E} \phi_{v_i v_j}(e)\right) / g_e$$

In the formula, $\phi_{v_i v_j}$ (e) is the shortest path between node i and node j which contains edge e. $g_e$ is the weight of edge e;

Step 6: Redefine the end condition of graph cycle division. In GN method, modularity Q is the index for measuring and evaluating community generation effect on graph structure. Q is defined as below:

$$Q = \Sigma_j(e_{jj} - a_j^2)$$

In the formula, the matrix element of community j is defined as $e_{jj}$. It represents edge quantity in community j; $a_j^2$ represents the quantity of edges that connect to any node in community structure j; in the division of function call graph, generally, Q value is around 0.3~0.7. The effect is better when it is closer to 1. When Q value reaches to peak and start to decline, it ends calculation.

Step 7: Confirmation of final generation result of community structure. The community division version which formed by each deletion of edge with the highest edge betweenness will be recorded. Through the evaluation of the malicious value, property and node scale situation of each community in these divided versions, the best community division version is selected. The community structures in this version will be confirmed as the final community structure generation result.

Step 8: Extraction of community feature; extract the information on three aspects as classification feature among the final confirmed community divided version: 1) community quantity with malicious feature; 2) the highest malicious value of communities; 3) the sum of malicious value of communities;

Step 9: Get determination result by feature vector classification. Undertake machine learning classification on classification features and get final malicious determination result.

In following text, it compares the method of this invention to the traditional GN method, three kinds of malicious code detection software, and a detection method on the base of control flow graph on the aspect of operation efficiency and detection rate.

As showed in FIG. 6, along with the increasing of node quantity in function call graph, the execution time of using traditional GN method in graph division will be increased quickly. However, the execution time of this method does not increase rapidly. It still keeps in a reasonable range. As showed in FIG. 7, along with the compression of training set, the detection efficiency of this method presents slow declination. It keeps above 80%. It reflects that the detection rate of this method does not have excessive reply on training set.

TABLE 1

Detection efficiency comparison of this method to the other three virus detection software, and a kind of detection method on the base of control flow graph

| Malicious code family | AVG (%) | Norton (%) | Androguard (%) | Detection method base on controlling flow chart | Detection method of this invention |
|---|---|---|---|---|---|
| ADRD | 100.0 | 22.7 | 59.1 | 95.5 | 100.0 |
| AnserverBot | 88.2 | 1.0 | 0.0 | 98.9 | 100.0 |
| BeanBot | 0.0 | 0.0 | 0.0 | 62.5 | 100.0 |
| Bgserv | 100.0 | 22.2 | 0.0 | 88.9 | 100.0 |
| DroidDream | 68.7 | 56.2 | 93.8 | 93.8 | 93.8 |
| DroidDreamLight | 30.4 | 23.9 | 28.2 | 100.0 | 97.8 |
| DroidKungFu1 | 100.0 | 5.8 | 0.0 | 97.1 | 97.1 |
| DroidKungFu3 | 0.0 | 0.3 | 0.0 | 100.0 | 98.7 |
| Geinimi | 100.0 | 55.0 | 97.1 | 100.0 | 100.0 |
| GoldDream | 61.7 | 0.0 | 40.4 | 100.0 | 100.0 |
| Pjapps | 75.8 | 44.8 | 41.4 | 97.8 | 96.6 |
| JSMSHider | 68.7 | 81.2 | 0.0 | 100.0 | 100.0 |
| Plankton | 100.0 | 9.0 | 18.2 | 90.9 | 100.0 |
| YZHC | 4.5 | 13.6 | 95.5 | 95.5 | 100.0 |
| Zsone | 100.0 | 41.6 | 100.0 | 100.0 | 100.0 |
| KMin | 100.0 | 76.9 | 78.8 | 100.0 | 100.0 |
| RogueSPPush | 100.0 | 0.0 | 100.0 | 98.9 | 100.0 |

According to table 1, in the malware detection of some major virus families of the experimental dataset, the detection rate range of this method is around 93.8% to 100%. The average detection rate is 99.1%. This result is better than other virus detection software and methods in table 1.

The invention claimed is:

1. A malicious code detection method for use with a mobile application program, the malicious code detection method comprising:
de-compiling a mobile application program to obtain decompilation code and to extract static information of the mobile application program;
analyzing the static information of the mobile application program to obtain frequency data of a static feature in a benign sample or a malicious sample, and distributing malicious value respectively according to respective frequency difference in different samples;
building a function call graph;
pretreating the function call graph, including deleting isolated nodes, and distributing weight for at least one node of the function call graph;
determining a betweenness value of the function call graph by searching for a shortest path from a key node to other nodes, the key node C being defined by:

$$C = C_i * w(i) = (D_i/(n-1)) * \left(\left(\sum_{m=1}^{k} w(q_m)\right) - k + 1\right) \quad (1)$$

wherein in equation (1), n represents node quantity in the function call graph; $D_i$ is degree of node i; K is the node quantity that connects directly to node i; W ($q_m$) is weight of node m in node set of k;

Graph definition G=(V, E), while V is node set; E is frontier set; and the calculation formula of edge betweenness is:

$$B_b = \left(\sum_{v_i \in V, v_j \in V, e \in E} \phi_{v_i v_j}(e)\right)/g_e \quad (2)$$

wherein in equation (2), $\phi_{v_i v_j}(e)$ is a shortest path between node i and j that includes edge e, where $g_e$ is weight of edge e;

determining a modularity Q as:

$$Q = \Sigma j(e_{jj} - a_j^2) \quad (3)$$

wherein in equation (3), a matrix element of community j is defined as $e_{jj}$, which represents edge quantity in the community j; $a_j^2$ represents the quantity of edges that connect to any node in the community structure j;

recording the community divided versions that are formed after each deletion of the edges with highest betweenness, and selecting a divided version based on evaluating the malicious value, property and node scale situation of each community in the community divided versions;

extracting from the divided version, as a classification feature, at least one of: (i) a community quantity with malicious feature, (ii) a highest malicious value in each community, and (iii) a total of malicious value of each community;

performing machine learning of the classification feature and obtaining a malicious determination result of the mobile application program.

2. The malicious code detection method according to claim 1, wherein the static information includes permissions in an Android application program, functions related to permissions, system APIs, JAVA packages, classes, and call relations of all functions included in the Android application program.

3. The malicious code detection method according to claim 1, wherein the machine learning of the classification features is performed by adopting offline separate training.

4. The malicious code detection method according to claim 1, wherein the adopted decompilation tool is androguard or apktool.

* * * * *